(12) United States Patent
Brisebois et al.

(10) Patent No.: US 10,200,324 B2
(45) Date of Patent: Feb. 5, 2019

(54) DYNAMICALLY PARTITIONING A MAILING LIST BASED ON A-PRIORI CATEGORIES AND CONTEXTUAL ANALYSIS

(71) Applicant: QUEST SOFTWARE INC., Aliso Viejo, CA (US)

(72) Inventors: Michel A. Brisebois, Renfrew (CA); Tomas C. Willis, Madison, WI (US); Curtis T. Johnstone, Ottawa (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 505 days.

(21) Appl. No.: 14/605,229

(22) Filed: Jan. 26, 2015

(65) Prior Publication Data

US 2016/0219008 A1 Jul. 28, 2016

(51) Int. Cl.
*H04L 12/58* (2006.01)

(52) U.S. Cl.
CPC .............. *H04L 51/12* (2013.01); *H04L 51/28* (2013.01)

(58) Field of Classification Search
CPC ................................ H04L 51/28; H04L 51/12
See application file for complete search history.

(56) References Cited

U.S. PATENT DOCUMENTS

2006/0031772 A1* 2/2006 Valeski ................. G06F 3/0481
715/751
2009/0176518 A1* 7/2009 Doni ....................... H04W 4/12
455/466
2012/0222132 A1* 8/2012 Burger .................. G06F 21/604
726/28

OTHER PUBLICATIONS

M. Brisebois et al., U.S. Appl. No. 13/906,241, filed May 30, 2013, entitled System and Method for Aggregation and Analysis.
M. Brisebois et al., U.S. Appl. No. 13/906,246, filed May 30, 2013, entitled System and Method for Classifying Data.
M. Brisebois et al., U.S. Appl. No. 13/906,255, filed May 30, 2013, entitled System and Method for Querying Data.
M. Brisebois et al., U.S. Appl. No. 14/089,427, filed Nov. 25, 2013, entitled System and Method for Data Loss Prevention Across Heterogeneous Communications Platforms.
M. Brisebois et al., U.S. Appl. No. 14/047,162, filed Oct. 7, 2013, entitled System and Method for Managing and Identifying Subject Matter Experts.

* cited by examiner

*Primary Examiner* — Kim T Nguyen
(74) *Attorney, Agent, or Firm* — Maschoff Brennan

(57) ABSTRACT

A system, method, and computer-readable medium for dynamically partitioning a directory list to limit recipients to an appropriate context. More specifically, in certain embodiments the dynamic partitioning includes a first component which describes a priori categories. In certain embodiments, the a priori categories could include "inner circle" or "trusted advisors" categories. Other categories could include "friends of the DL" who only want occasional but relevant messages. In certain embodiments, these categories are created by a DL owner. However, in certain embodiments, members (e.g., recipients) could also change their own category. For example, a DL could have categories: All, Required participants, FYI participants, Managers.

18 Claims, 4 Drawing Sheets

DYNAMICALLY PARTITIONING A MAILING LIST BASED ON A-PRIORI CATEGORIES AND CONTEXTUAL ANALYSIS

BACKGROUND OF THE INVENTION

Field of the Invention

The present invention relates to information handling systems. More specifically, embodiments of the invention relate to dynamically partitioning a mailing list based on a-priori categories and contextual analysis.

Description of the Related Art

It is known to use Directory lists (DLs) for sending messages to a large defined group. On occasion, mailing an entire group is not warranted. Some on the list might prefer "need to know" messages rather than every message. Based on the sender's requirements, the partitioning of the DL may be based on different criteria. Additionally, it is often difficult to send only to DL members that are in a specific location, of a certain rank, or are immediately available. It can also be difficult to escalate a DL thread, often requiring addition of individuals to a DL on an ad hoc basis.

With external mailing lists, users are often more sensitive to unnecessary emails. However, internal email can also cause significant lost productivity and information overload. Additionally, an organization might have certain corporate policies in place that could impact who can be contacted via a DL and for what purpose. In this context, only manual judgment or intervention can match policy and DL inclusion.

Known DLs and mailing lists often don't have built-in awareness of the predisposition of its members. Some people create many variants of DLs to manage better targeted access; however, this process can be difficult to manage. Accordingly, many large organizations suffer from "DL Overload." Microsoft's Exchange does support "Dynamic DLs" based on parameter of some Active Directory component. For example creating a DL for all employees of a particular location or department may be performed without having to specify individual members. However, this method generally only works for organizational parameters, but not personal context (such as "I'm busy right now," "I'm out of the office," etc.).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for dynamically partitioning a directory list to limit recipients to an appropriate context. More specifically, in certain embodiments the dynamic partitioning includes a first component which describes a priori categories. In certain embodiments, the a priori categories could include "inner circle" or "trusted advisors" categories. Other categories could include "friends of the DL" who only want occasional but relevant messages. In certain embodiments, these categories are created by a DL owner. However, in certain embodiments, members (e.g., recipients) could also change their own category. For example, a DL could have categories: All, Required participants, FYI participants, Managers.

Additionally, in certain embodiments, the dynamic partitioning includes DL filters. In certain embodiments, the DL filters could also be dynamic. In certain embodiments, the dynamic DL filters could include one or more of: only send to frequent participants (based on the past behaviors); only send to those meeting a certain Data Loss Prevention (DLP) policy; only send to those who are not out of office; only send to those available right now (where in certain embodiments availability is determined by a presence status); and, only send to those that are experts in the topic discussed.

Additionally, in certain embodiments, the dynamic partitioning provides a receiver with control as to what level of mail they wish to receive for example with respect to static categories. Additionally, in certain embodiments, the dynamic partitioning provides a DL overview to DL recipients. In certain embodiments, the DL overview provides a scheduled list of DL activity that certain recipients may have missed.

Additionally, in certain embodiments, a recipient could suspend receiving individual messages from a DL. Instead the recipient could link to the activity of the DL for a specified time period. Such an operation effectively turns a barrage of individual emails into a forum that can be accessed via a DL dashboard. In certain embodiments, DL inclusion and/or participation is driven by active Data Loss Prevention policies. More specifically, a DL policy management engine determines appropriate access in real-time based on the user's context. For example, whether to allow a DL from an external/public Internet Protocol (IP) address and/or from a bring your own device (BYOD) user. Another example is using a subject/keyword policy to insure adherence to an original purpose of the DL.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
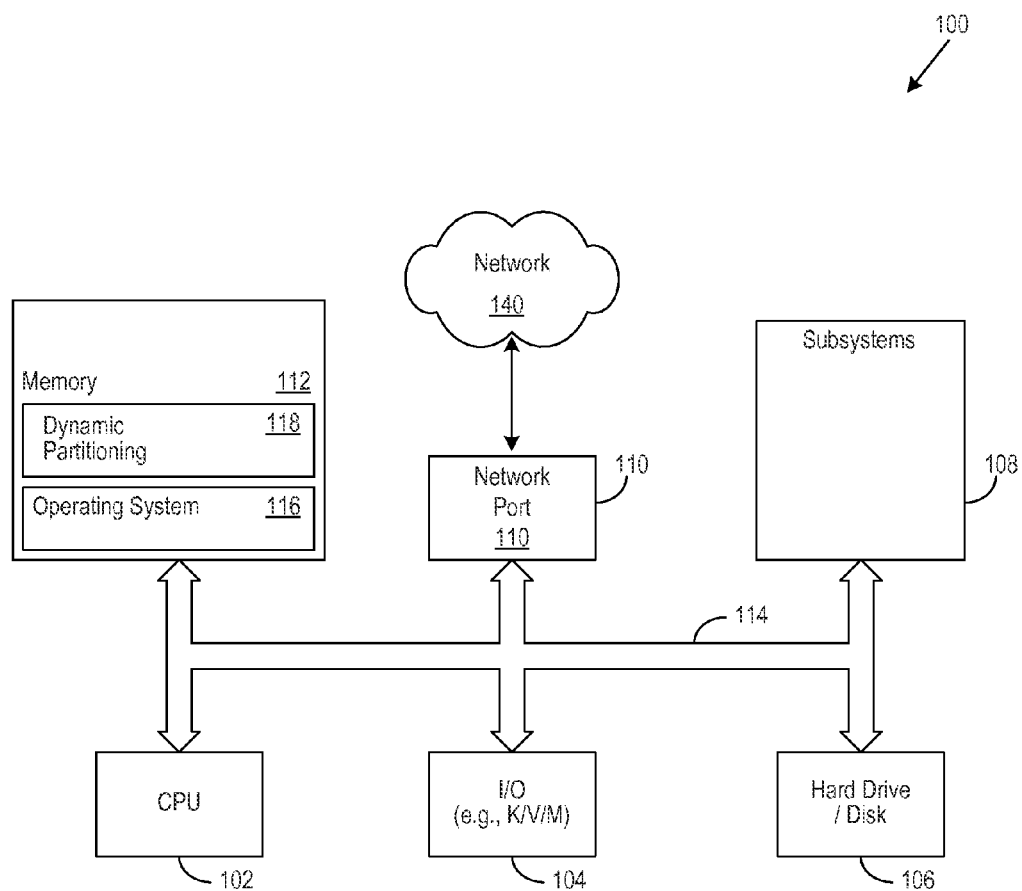
FIG. 1 shows a block diagram of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112 which is interconnected to the foregoing via one or more buses 114.

System memory 112 further comprises operating system (OS) 116 and in various embodiments may also comprise dynamic partitioning module 118. The dynamic partitioning module 118 allows dynamically partitioning a directory list to limit recipients to an appropriate context. More specifically, in certain embodiments the dynamic partitioning module 118 includes a component which describes a priori categories. In certain embodiments, the a priori categories could include "inner circle" or "trusted advisors" categories. Other categories could include "friends of the DL" who only want occasional but relevant messages. In certain embodiments, these categories are created by a DL owner. However, in certain embodiments, members could also change their own category. For example, a DL could have categories: All, Required participants, FYI participants, Managers. The dynamic partitioning module 118 then partitions a directory list based upon the described a priori categories so as to limit recipients to an appropriate context.

Figure 2:
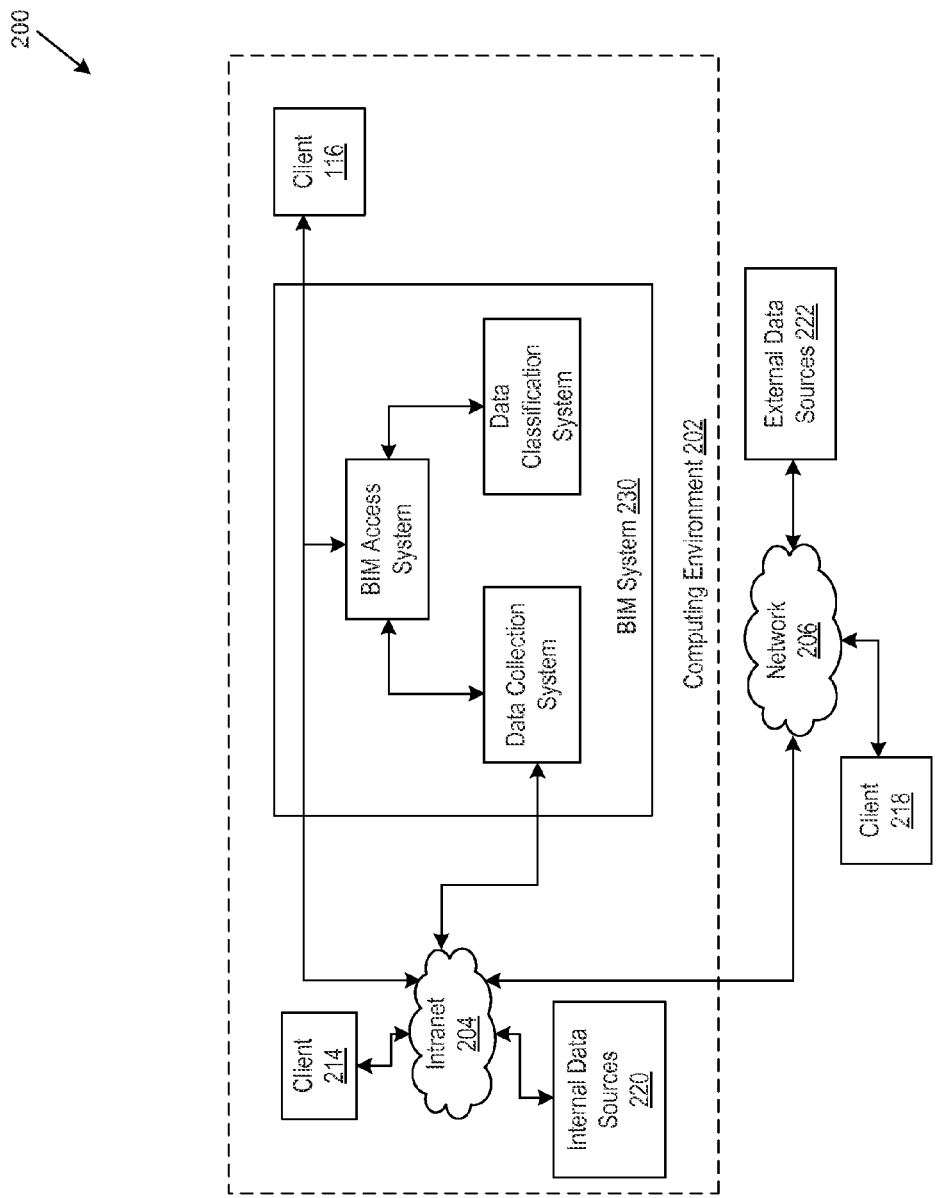
FIG. 2 shows a block diagram of a networked computing environment.

Referring to FIG. 2, an example of a networked computing environment 200 is shown. The networked computing environment 200 can include a computing environment 202 that is associated with a business or organization. The computing environment 202 may vary based on the type of organization or business. However, generally, the computing environment 202 may include at least a number of computing systems (such as one or more information handling system 100). For example, the computing environment may include clients, servers, databases, mobile computing devices (e.g., tablets, laptops, smartphones, etc.), virtual computing devices, shared computing devices, networked computing devices, and the like. Further, the computing environment 202 may include one or more networks, such as intranet 204.

The computing environment 202 includes a Business Insights on Messaging (BIM) system 230. Using the BIM system 230, a user can examine the data available to a business regardless of where the data was generated or is stored. Further, in some embodiments, the user can use the BIM system 230 to identify trends and/or metadata associated with the data available to the BIM system 230. In certain embodiments, the BIM system 230 can access the data from internal data sources 220, external data sources 222, or a combination of the two. The data that can be accessed from the internal data sources 220 can include any data that is stored within the computing environment 202 or is accessed by a computing system that is associated with the computing environment 202. For example, the data may include information stored in employee created files, log files, archived files, internal emails, outgoing emails, received emails, received files, data downloaded from an external network or the internet, etc. The type of data is not limited and may depend on the organization or business associated with the computing environment 202. For example, the data can include sales numbers, contact information, vendor costs, product designs, meeting minutes, the identity of file creators, the identity of file owners, the identity of users who have accessed a file or are authorized to access a file, etc.

The data that can be accessed from the external data sources 222 can include any data that is stored outside of the computing environment 202 and is publicly accessible or otherwise accessible to the BIM system 230. For example, the data can include data from social networking sites, customer sites, Internet sites, or any other data source that is publicly accessible or which the BIM system 230 has been granted access. In some cases, a subset of the data may be unavailable to the BIM system 230. For example, portions of the computing environment 202 may be configured for private use.

The internal data sources 220 can include any type of computing system that is part of or associated with the computing environment 202 and is available to the BIM system 230. These computing systems can include database systems or repositories, servers (e.g., authentication servers, file servers, email servers, collaboration servers), clients, mobile computing systems (including e.g., tablets, laptops, smartphones, etc.), virtual machines, CRM systems, directory services, such as lightweight directory access protocol (LDAP) systems, and the like. Further, in some cases, the internal data sources 220 can include the clients 214 and 216. The external data sources 222 can include any type of computing system that is not associated with the computing environment 202, but is accessible to the BIM system 230. For example, the external data sources 222 can include any computing systems associated with cloud services, social media services, hosted applications, etc.

The BIM system 230 can communicate with the internal data sources 220 via the intranet 204. The intranet 204 can include any type of wired and/or wireless network that enables computing systems associated with the computing environment 202 to communicate with each other. For example, the intranet 204 can include any type of a LAN, a WAN, an Ethernet network, a wireless network, a cellular network, a virtual private network (VPN) and an ad hoc network. In some embodiments, the intranet 204 may include an extranet that is accessible by customers or other users who are external to the business or organization associated with the computing environment 202.

The BIM system 230 can communicate with the external data sources 222 via the network 206. The network 206 can include any type of wired, wireless, or cellular network that enables one or more computing systems associated with the computing environment 202 to communicate with the external data sources 222 and/or any computing system that is not associated with the computing environment 202. In some cases, the network 206 can include the Internet.

A user can access the BIM system 230 using any computing system that can communicate with the BIM system 230. For example, the user can access the BIM system 230 using the client 214, which can communicate with the BIM system 230 via the intranet 204, the client 216, which can communicate via a direct communication connection with the BIM system 230, or the client 218, which can communicate with the BIM system 230 via the network 206.

As shown in FIG. 2, in some embodiments, the client 218 may not be associated with the computing environment 202. In such embodiments, the client 218 and/or a user associated with the client 218 may be granted access to the BIM system 230. The clients 214, 216, and 218 may include any type of computing system including, for example, a laptop, desktop, smartphone, tablet, or the like. In some embodiments, the BIM system 230 may determine whether the user is authorized to access the BIM system 230 as described in further detail below.

The BIM system 230 can include a data collection system 232, a data classification system 234, and a BIM access system 236. The data collection system 232 can collect data or information from one or more data sources for processing by the BIM system 230.

Figure 3:
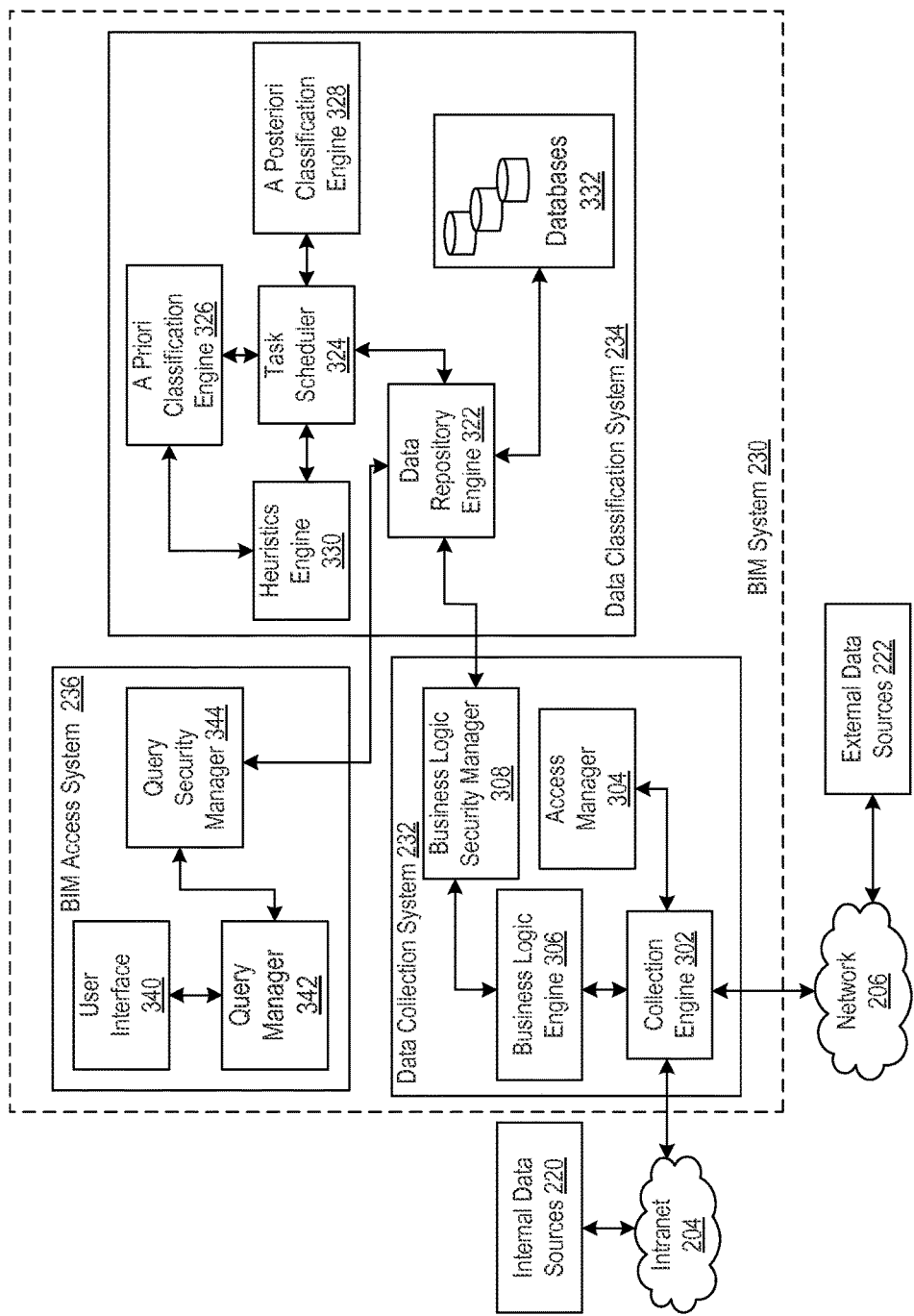
FIG. 3 shows a block diagram of a Business Insight on Message (BIM) system.

In some embodiments, the data collection system 232 can reformat the collected data to facilitate processing by the BIM system 230. Further, in some cases, the data collection system 232 may reformat collected data into a consistent or defined format that enables the comparison or processing of data that is of the same or a similar type, but which may be formatted differently because, for example, the data is obtained from different sources. The data collection system 232 is described in more detail below with reference to FIG. 3.

The data classification system 234 can store and classify the data obtained by the data collection system 232. In addition to predefined classifications, the data classification system 234 can identify and develop new classifications and associations between data using, for example, heuristics and probabilistic algorithms.

The BIM access system 236 can provide users with access to the BIM system 230. In some embodiments, the BIM access system 236 determines whether a user is authorized to access the BIM system 230. The BIM access system 236 enables a user to query one or more databases (not shown) of the data classification system 234 to obtain access to the data collected by the data collection system 232. Further, the BIM access system 236 enables a user to mine the data and/or to extract metadata by, for example, creating queries based on the data and the data classifications. Advantageously, in certain embodiments, because the data classification system 234 can classify data obtained from a number of data sources, more complex queries can be created compared to a system that can only query its own database or a single data source.

Additionally, in certain embodiments, the BIM access system 236 can enable users to create, share, and access query packages. As described in greater detail below, a query package can encapsulate one or more pre-defined queries, one or more visualizations of queried data, and other package attributes. When a user selects a query package, the query package can be executed in a determined manner in similar fashion to other queries. As an additional advantage, in some embodiments, because the data classification system 234 can use heuristics and probabilistic algorithms to develop and modify data classifications over time, user queries are not limited to a set of predefined search variables.

Referring to FIG. 2, an embodiment of an implementation of the BIM system 230 is shown. As previously described above, the BIM system 230 can include a data collection system 232 configured to, among other things, collect data from the internal data sources 220 and/or the external data sources 222. The data collection system 232 can include a collection engine 302, an access manager 304, a business logic engine 306, and a business logic security manager 308.

Generally, the collection engine 302 may access the internal data sources 220 thereby providing the BIM system 230 with access to data that is stored by or generated by the internal data sources 220. This data can include any data that may be created, accessed, or received by a user or in response to the actions of a user who is associated with the computing environment 202. Further, in some embodiments, the collection engine 302 can access the external data sources 222, thereby providing the BIM system 230 with access to data from the external data sources 222. In some embodiments, the data can include metadata. For example, supposing that the collection engine 302 accesses a file server, the data can include metadata associated with the files stored on the file server, such as the file name, file author, file owner, time created, last time edited, etc.

In some cases, a number of internal data sources 220 and/or external data sources 222 may require a user or system to be identified and/or authenticated before access to the data source is granted. Authentication may be required for a number of reasons. For example, the data source may provide individual accounts to users, such as a social networking account, email account, or collaboration system account. As another example, the data source may provide different features based on the authorization level of a user. For example, a billing system may be configured to allow all employees of an organization to view invoices, but to only allow employees of the accounting department to modify invoices.

For data sources that require authentication or identification of a specific user, the access manager 304 can facilitate access to the data sources. The access manager 304 can manage and control credentials for accessing the data sources. For example, the access manager 304 can store and manage user names, passwords, account identifiers, certificates, tokens, and any other information that can be used to access accounts associated with one or more internal data sources 220 and/or external data sources 222. For instance, the access manager 304 may have access to credentials associated with a business's Facebook™ or Twitter™ account. As another example, the access manager may have access to credentials associated with an LDAP directory, a file management system, or employee work email accounts.

In some embodiments, the access manager 304 may have credentials or authentication information associated with a master or super user account enabling access to some or all of the user accounts without requiring credentials or authentication information associated with each of the users. In some cases, the collection engine 302 can use the access manager 304 to facilitate accessing internal data sources 220 and/or external data sources 222.

The business logic engine 306 can include any system that can modify or transform the data collected by the collection engine 302 into a standardized format. In some embodiments, the standardized format may differ based on the data source accessed and/or the type of data accessed. For example, the business logic engine 306 may format data associated with emails, data associated with files stored at the computing environment 202, data associated with web pages, and data associated with research files differently. However, each type of data may be formatted consistently. Thus, for example, data associated with product design files may be transformed or abstracted into a common format regardless of whether the product design files are of the same type. As a second example, suppose that the business logic engine 306 is configured to record time using a 34-hour clock format. In this second example, if one email application records the time an email was sent using a 34-hour clock format, and a second email application uses a 22-hour clock format, the business logic engine 306 may reformat the data from the second email application to use a 34-hour clock format.

In some embodiments, a user may define the format for processing and storing different types of data. In other embodiments, the business logic engine 306 may identify a standard format to use for each type of data based on, for example, the format that is most common among similar types of data sources, the format that reduces the size of the information, or any other basis that can be used to decide a data format.

The business logic security manager 308 can include any system that can implement security and data access policies for data accessed by the collection engine 302. In some embodiments, the business logic security manager 308 may apply the security and data access policies to data before the data is collected as part of a determination of whether to collect particular data. For example, an organization may designate a private folder or directory for each employee and the data access policies may include a policy to not access any files or data stored in the private directory. Alternatively, or in addition, the business logic security manager 308 may apply the security and data access policies to data after it is collected by the collection engine 302. Further, in some cases, the business logic security manager 308 may apply the security and data access policies to the abstracted and/or reformatted data produced by the business logic engine 306. For example, suppose the organization associated with the computing environment 202 has adopted a policy of not collecting emails designated as personal. In this example, the business logic security manager 308 may examine email to determine whether it is addressed to an email address designated as personal (e.g., email addressed to family members) and if the email is identified as personal, the email may be discarded by the data collection system 232 or not processed any further by the BIM system 230.

In some embodiments, the business logic security manager 308 may apply a set of security and data access policies to any data or metadata provided to the classification system 234 for processing and storage. These security and data access policies can include any policy for regulating the storage and access of data obtained or generated by the data collection system 232. For example, the security and data access policies may identify the users who can access the data provided to the data classification system 234. The determination of which users can access the data may be based on the type of data. The business logic security manager 308 may tag the data with an identity of the users, or class or role of users (e.g., mid-level managers and more senior) who can access the data. As another example of a security and data access policy, the business logic security manager 308 may determine how long the data can be stored by the data classification system 234 based on, for example, the type of data or the source of the data.

After the data collection system 232 has collected and, in some cases, processed the data obtained from the internal data sources 220 and/or the external data sources 222, the data may be provided to the data classification system 234 for further processing and storage. The data classification system 234 can include a data repository engine 322, a task scheduler 324, an a priori classification engine 326, an a posteriori classification engine 328, a heuristics engine 330, and a set of databases 332.

The data repository engine 322 can include any system for storing and indexing the data received from the data collection system 232. The data repository engine 322 can store the data, including any generated indexes, at the set of databases 332, which can include one or more databases or repositories for storing data. In some cases, the set of databases 332 can store data in separate databases based on any factor including, for example, the type of data, the source of data, or the security level or authorization class associated with the data, and the class of users who can access the data.

In some implementations, the set of databases 332 can dynamically expand and, in some cases, the set of databases 332 may be dynamically structured. For example, if the data repository engine 322 receives a new type of data that includes metadata fields not supported by the existing databases of the set of databases 332, the data repository engine 322 can create and initialize a new database that includes the metadata fields as part of the set of databases 332. For instance, suppose the organization associated with the computing environment 202 creates its first social media account for the organization to expand its marketing initiatives. Although the databases 332 may have fields for customer information and vendor information, it may not have a field identifying whether a customer or vendor has indicated they "like" or "follow" the organization on its social media page. The data repository engine 322 can create a new field in the databases 332 to store this information and/or create a new database to capture information extracted from the social media account including information that relates to the organization's customers and vendors.

In certain embodiments, the data repository engine 322 can create abstractions of and/or classify the data received from the data collection system 232 using, for example, the task scheduler 324, the a priori classification engine 326, the a posteriori classification engine 328, and the heuristics engine 330. The task scheduler 324 can include any system that can manage the abstraction and classification of the data received from the data collection system 232. In some embodiments, the task scheduler 324 can be included as part of the data repository engine 322.

Data that is to be classified and/or abstracted can be supplied to the task scheduler 324. The task scheduler 324 can supply the data to the a priori classification engine 326, which can include any system that can classify data based on a set of user-defined, predefined, or predetermined classifications. These classifications may be provided by a user (e.g., an administrator) or may be provided by the developer of the BIM system 230. Although not limited as such, the predetermined classifications generally include objective classifications that can be determined based on attributes associated with the data. For example, the a priori classification engine 326 can classify communications based on whether the communication is an email, an instant message, or a voice mail. As a second example, files may be classified based on the file type, such as whether the file is a drawing file (e.g., an AutoCAD™ file), a presentation file (e.g., a PowerPoint™ file), a spreadsheet (e.g., an Excel™ file), a word processing file (e.g., a Word™ file), etc. Although not limited as such, the a priori classification engine 326 generally classifies data at or substantially near the time of collection by the collection engine 302. The a priori classification engine 326 can classify the data prior to the data being stored in the databases 332. However, in some cases, the data may be stored prior to or simultaneously with the a priori classification engine 326 classifying the data. The data may be classified based on one or more characteristics or pieces of metadata associated with the data. For example, an email may be classified based on the email address, a domain or provider associated with the email (e.g., a Yahoo® email address or a corporate email address), or the recipient of the email.

In addition to, or instead of, using the a priori classification engine 326, the task scheduler 324 can provide the data to the a posteriori classification engine 328 for classification or further classification. The a posteriori classification engine 328 can include any system that can determine trends with respect to the collected data. Although not limited as such, the a posteriori classification engine 328 generally classifies data after the data has been collected and stored at the databases 332. However, in some cases, the a posteriori classification engine 328 can also be used to classify data as it is collected by the collection engine 302. Data may be processed and classified or reclassified multiple times by the a posteriori classification engine 328. In some cases, the classification and reclassification of the data occurs on a continuing basis. In other cases, the classification and reclassification of data occurs during specific time periods of events. For example, data may be reclassified each day at midnight or once a week. As another example, data may be reclassified each time one or more of the a posteriori algorithms is modified or after the collection of new data.

In some cases, the a posteriori classification engine 328 classifies data based on one or more probabilistic algorithms. The probabilistic algorithms may be based on any type of statistical analysis of the collected data. For example, the probabilistic algorithms may be based on Bayesian analysis or probabilities. Further, Bayesian inferences may be used to update the probability estimates calculated by the a posteriori classification engine 328. In some implementations, the a posteriori classification engine 328 may use machine learning techniques to optimize or update the a posteriori algorithms. In some embodiments, some of the a posteriori algorithms may determine the probability that a piece or set of data (e.g., an email) should have a particular classification based on an analysis of the data as a whole. Alternatively, or in addition, some of the a posteriori algorithms may determine the probability that a set of data should have a particular classification based on the combination of probabilistic determinations associated with subsets of the data, parameters, or metadata associated with the data (e.g., classifications associated with the content of the email, the recipient of the email, the sender of the email, etc.).

For example, continuing with the email example, one probabilistic algorithm may be based on the combination of the classification or determination of four characteristics associated with the email, which may be used to determine whether to classify the email as a personal email, or non-work related. The first characteristic can include the probability that an email address associated with a participant (e.g., sender, recipient, BCC recipient, etc.) of the email conversation is used by a single employee. This determination may be based on the email address itself (e.g., topic based versus name based email address), the creator of the email address, or any other factor that can be used to determine whether an email address is shared or associated with a particular individual. The second characteristic can include the probability that keywords within the email are not associated with peer-to-peer or work-related communications.

For example, terms of endearment and discussion of children and children's activities are less likely to be included in work related communications. The third characteristic can include the probability that the email address is associated with a participant domain or public service provider (e.g., Yahoo® email or Google® email) as opposed to a corporate or work email account. The fourth characteristic can include determining the probability that the message or email thread can be classified as conversational as opposed to, for example, formal. For example, a series of quick questions in a thread of mails, the use of a number of slang words, or excessive typographical errors may indicate that an email is likely conversational. The a posteriori classification engine 328 can use the determined probabilities for the above four characteristics to determine the probability that the email communication is personal as opposed to, for example, work-related, or spam email.

The combination of probabilities may not total 200%. Further, the combination may itself be a probability and the classification can be based on a threshold determination. For example, the threshold may be set such that an email is classified as personal if there is a 90% probability for three of the four above parameters indicating the email is personal (e.g., email address is used by a single employee, the keywords are not typical of peer-to-peer communication, at least some of the participant domains are from known public service providers, and the message thread is conversational).

As another example of the a posteriori classification engine 328 classifying data, the a posteriori classification engine 328 can use a probabilistic algorithm to determine whether a participant of an email is a customer. The a posteriori classification engine 328 can use the participant's identity (e.g., a customer) to facilitate classifying data that is associated with the participant (e.g., emails, files, etc.). To determine whether the participant should be classified as a customer, the a posteriori classification engine 328 can examiner a number of parameters including a relevant Active Directory Organizational Unit (e.g., sales, support, finance) associated with the participant and/or other participants in communication with the participant, the participant's presence in forum discussions, etc. In some cases, characteristics used to classify data may be weighted differently as part of the probabilistic algorithm. For example, email domain may be a poor characteristic to classify a participant in some cases because the email domain may be associated with multiple roles. For instance, Microsoft® may be a partner, a customer, and a competitor.

In some implementations, a user (e.g., an administrator) can define the probabilistic algorithms used by the a posteriori classification engine 328. For example, suppose customer Y is a customer of business X and that the management of business X is interested in tracking the percentage of communication between business X and customer Y that relates to sales. Further, suppose that a number of employees from business X and a number of employees from business Y are in communication via email. Some of these employees may be in communication to discuss sales. However, it is also possible that some of the employees may be in communication for technical support issues, invoicing, or for personal reasons (e.g., a spouse of a business X employee may work at customer Y). Thus, in this example, to track the percentage of communication between business X and customer Y that relates to sales the user may define a probabilistic algorithm that classifies communications based on the probability that the communication relates to sales. The algorithm for determining the probability may be based on a number of pieces of metadata associated with each communication. For example, the metadata may include the sender's job title, the recipient's job title, the name of the sender, the name of the recipient, whether the communication identifies a product number or an order number, the time of communication, a set of keywords in the content of the communication, etc.

Using the a posteriori classification engine 328, data may be classified based on metadata associated with the data. For example, the communication in the above example can be classified based on whether it relates to sales, supplies, project development, management, personnel, or is personal. The determination of what the data relates to can be based on any criteria. For example, the determination may be based on keywords associated with the data, the data owner, the data author, the identity or roles of users who have accessed the data, the type of data file, the size of the file, the data the file was created, etc.

In certain embodiments, the a posteriori classification engine 328 can use the heuristics engine 330 to facilitate classifying data. Further, in some cases, the a posteriori classification engine 328 can use the heuristics engine 330 to validate classifications, to develop probable associations between potentially related content, and to validate the associations as the data collection system 232 collects more data. In certain embodiments, the a posteriori classification engine 328 may base the classifications of data on the associations between potentially related content. In some implementations, the heuristic engine 330 may use machine learning techniques to optimize or update the heuristic algorithms.

In some embodiments, a user (e.g., an administrator) can verify whether the data or metadata has been correctly classified. Based on the result of this verification, in some cases, the a posteriori classification engine 328 may correct or update one or more classifications of previously processed or classified data. Further, in some implementations, the user can verify whether two or more pieces of data or metadata have been correctly associated with each other.

Based on the result of this verification, the a posteriori classification engine 328 using, for example, the heuristics engine 330 can correct one or more associations between previously processed data or metadata. Further, in certain embodiments, one or more of the a posteriori classification engine 328 and the heuristics engine 330 may update one or more algorithms used for processing the data provided by the data collection system 232 based on the verifications provided by the user.

In some embodiments, the heuristics engine 330 may be used as a separate classification engine from the a priori classification engine 326 and the a posteriori classification engine 328. Alternatively, the heuristics engine 330 may be used in concert with one or more of the a priori classification engine 326 and the a posteriori classification engine 328. Similar to the a posteriori classification engine 328, the heuristics engine 330 generally classifies data after the data has been collected and stored at the databases 332. However, in some cases, the heuristics engine 330 can also be used to classify data as it is collected by the collection engine 302.

The heuristics engine 330 can use any type of heuristic algorithm for classifying data. For example, the heuristics engine 330 can determine whether a number of characteristics are associated with the data and based on the determination, classify the data. For example, data that mentions a product, includes price information, addresses (e.g., billing and shipping addresses), and quantity information may be classified as sales data. In some cases, the heuristics engine 330 can classify data based on a subset of characteristics. For example, if a majority or two-thirds of characteristics associated with a particular classification are identified as existing in a set of data, the heuristics engine 330 can associate the classification with the set of data. In some cases, the heuristics engine 330 determines whether one or more characteristics are associated with the data. In other words, the heuristics engine can determine whether a particular characteristic is or is not associated with the data. Alternatively, or in addition, the heuristics engine 330 can determine the value or attribute of a particular characteristic associated with the data. The value or attribute of the characteristic may then be used to determine a classification for the data. For example, one characteristic that may be used to classify data is the length of the data. For instance, in some cases, a long email may make one classification more likely than a short email.

The a priori classification engine 326 and the a posteriori classification engine 328 can store the data classification at the databases 332. Further, the a posteriori classification engine 328 and the heuristics engine 330 can store the probable associations between potentially related data at the databases 332. In some cases, as classifications and associations are updated based on, for example, user verifications or updates to the a posteriori and heuristic classification and association algorithms, the data or metadata stored at the databases 332 can be modified to reflect the updates.

Users can communicate with the BIM system 230 using a client computing system (e.g., client 214, client 216, or client 218). In some cases, access to the BIM system 230, or to some features of the BIM system 230, may be restricted to users who are using clients associated with the computing environment 202. As described above, in some cases, at least some users can access the BIM system 230 to verify classifications and associations of data by the data classification system 234. In addition, in some cases, at least some users can access at least some of the data and/or metadata stored at the data classification system 234 using the BIM access system 236. The BIM access system 236 can include a user interface 340, a query manager 342, and a query security manager 344.

The user interface 340 can generally include any system that enables a user to communicate with the BIM system 230. Further, the user interface 340 enables the user to submit a query to the BIM system 230 to access the data or metadata stored at the databases 332. Moreover, the query can be based on any number of or type of data or metadata fields or variables. Advantageously, in certain embodiments, by enabling a user to create a query based on any number or type of fields, complex queries can be generated. Further, because the BIM system 230 can collect and analyze data from a number of internal and external data sources, a user of the BIM system 230 can extract data that is not typically available by accessing a single data source. For example, a user can query the BIM system 230 to locate all personal messages sent by the members of the user's department within the last month. As a second example, a user can query the BIM system 230 to locate helpdesk requests received in a specific month outside of business hours that were sent by customers from Europe. As an additional example, a product manager may create a query to examine customer reactions to a new product release or the pitfalls associated with a new marketing campaign. The query may return data that is based on a number of sources including, for example, emits received from customers or users, Facebook® posts, Twitter® feeds, forum posts, quantity of returned products, etc.

Further, in some cases, a user can create a relatively simple query to obtain a larger picture of an organization's knowledge compared to systems that are incapable of integrating the potentially large number of information sources used by some businesses or organizations. For example, a user can query the BIM system 230 for information associated with customer X over a time range. In response, the BIM system 230 may provide the user with all information associated with customer X over the time range, which can include who communicated with customer X, the percentage of communications relating to specific topics (e.g., sales, support, etc.), the products designed for customer X, the employees who performed any work relating to customer X and the employees' roles, etc. This information may not be captured by a single source. For example, the communications may be obtained from an email server, the products may be identified from product drawings, and the employees and their roles may be identified by examining who accessed specific files in combination with the employees' human resources (HR) records.

The query manager 342 can include any system that enables the user to create the query. The query manager 342 can cause the available types of search parameters for searching the databases 332 to be presented to a user via the user interface 340. These search parameter types can include any type of search parameter that can be used to form a query for searching the databases 332. For example, the search parameter types can include names (e.g., employee names, customer names, vendor names, etc.), data categories (e.g., sales, invoices, communications, designs, miscellaneous, etc.), stored data types (e.g., strings, integers, dates, times, etc.), data sources (e.g., internal data sources, external data sources, communication sources, sales department sources, product design sources, etc.), dates, etc. In some cases, the query manager 342 can also parse a query provided by a user. For example, some queries may be provided using a text-based interface or using a text-field in a Graphical User Interface (GUI).

In such cases, the query manager 342 may be configured to parse the query. The query manager 342 can further include any system that enables the user to create or select a query package that serves as the query. In certain embodiments, the query manager 342 can maintain query packages for each user, group of users, and/or the like. The query packages can be stored, for example, in a SQL database that maintains each user's query packages in a table by a unique identifier. In some embodiments, each user may have a profile that includes a list of package identifiers for that user. The query manager 342 can cause query packages associated with the user to be presented and made selectable via the user interface 340.

In various embodiments, the query manager 342 can also facilitate creation of new query packages. New query packages can be made accessible to users in various ways. For example, the new query packages can be created by the user, shared with the user by another user, pushed to the user by an administrator, or created in another fashion. Further, the query manager 342 can cause any type of additional options for querying the databases 332 to be presented to the user via the user interface 340. These additional options can include, for example, options relating to how query results are displayed or stored.

In some cases, access to the data stored in the BIM system 230 may be limited to specific users or specific roles. For example, access to the data may be limited to "Bob" or to senior managers. Further, some data may be accessible by some users, but not others. For example, sales managers may be limited to accessing information relating to sales, invoicing, and marketing, technical managers may be limited to accessing information relating to product development, design and manufacture, and executive officers may have access to both types of data, and possibly more. In certain embodiments, the query manager 342 can limit the search parameter options that are presented to a user for forming a query based on the user's identity and/or role.

The query security manager 344 can include any system for regulating who can access the data or subsets of data. The query security manager 344 can regulate access to the databases 332 and/or a subset of the information stored at the databases 332 based on any number and/or types of factors. For example, these factors can include a user's identity, a user's role, a source of the data, a time associated with the data (e.g., the time the data was created, a time the data was last accessed, an expiration time, etc.), whether the data is historical or current, etc.

Further, the query security manager 344 can regulate access to the databases 332 and/or a subset of the information stored at the databases 332 based on security restrictions or data access policies implemented by the business logic security manager 308. For example, the business logic security manager 308 may identify all data that is "sensitive" based on a set of rules, such as whether the data mentions one or more keywords relating to an unannounced product in development. Continuing this example, the business logic security manager 308 may label the sensitive data as, for example, sensitive, and may identify which users or roles, which are associated with a set of users, can access data labeled as sensitive. The query security manager 344 can then regulate access to the data labeled as sensitive based on the user or the role associated with the user who is accessing the databases 332.

Although illustrated separately, in some embodiments, the query security manager 344 can be included as part of the query manager 342. Further, in some cases, one or both of the query security manager 344 and the query manager 342 can be included as part of the user interface 340. In certain embodiments, some or all of the previously described systems can be combined or further divided into additional systems. Further, some or all of the previously described systems may be implemented in hardware, software, or a combination of hardware and software.

Figure 4:
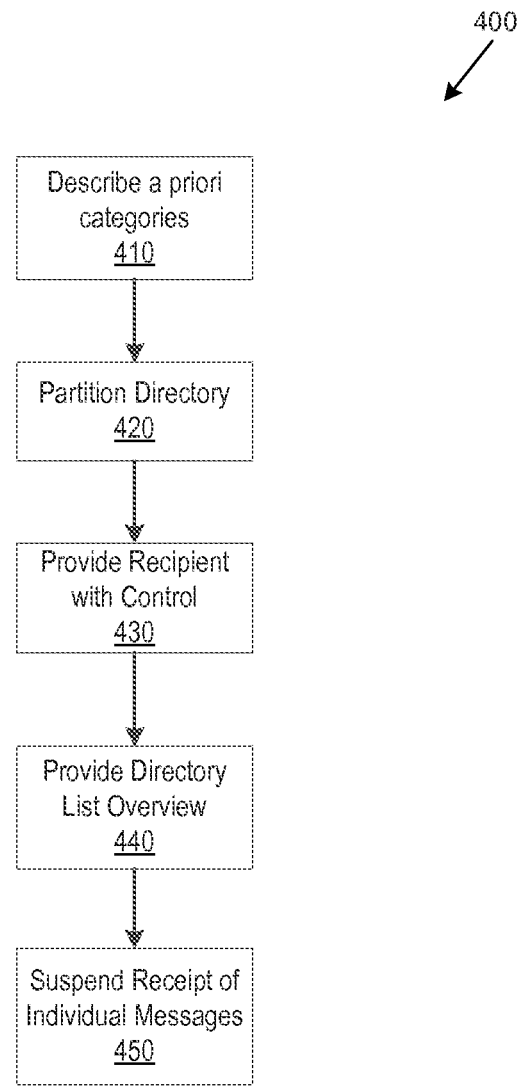
FIG. 4 shows a flow chart of a dynamic partitioning system.

Referring to FIG. 4, a flow chart of the operation of a dynamic partitioning system 400 is shown. In certain embodiments, the dynamic partitioning system 400 comprises the dynamic partitioning module 118. The dynamically partitioning system 400 dynamically partitions a directory list to limit recipients to an appropriate context. It will be appreciated that in various embodiments, the dynamic partitioning system may perform some or all of the following steps.

More specifically, the dynamic partitioning system begins operation at step 410 by accessing a first component which describes a priori categories. The a priori categories comprise categories relating to or denoting knowledge the proceeds from theoretical deduction rather than from observation or experience. For example, in certain embodiments, the a priori categories could include "inner circle" or "trusted advisors" categories. Other categories could include "friends of the DL" who only want occasional but relevant messages. In certain embodiments, these categories are created by a DL owner. However, in certain embodiments, members (e.g., recipients) could also change their own category. For example, a DL could have categories: All, Required participants, FYI participants, Managers.

Next, at step 420, the dynamic partitioning system 400 partitions the directory list by accessing accesses DL filters based upon the a priori categories. In certain embodiments, the DL filters are dynamic. In certain embodiments, the dynamic DL filters could include one or more of: only send to frequent participants (based on the past behaviors); only send to those meeting a certain Data Loss Prevention (DLP) policy; only send to those who are not out of office; only send to those available right now (where in certain embodiments availability is determined by a presence status); and, only send to those that are experts in the topic discussed (such as via the method described in co-pending application Ser. No. 14/047,162, entitled "System and Method for managing and Identifying Subject Matter Experts," which is incorporated in its entirety herein).

Next, at step 430, in certain embodiments, the dynamic partitioning system provides a receiver with control as to what level of mail they wish to receive, for example with respect to static categories. Next, at step 440, the dynamic partitioning system 400 provides a DL overview to DL recipients. In certain embodiments, the DL overview provides a scheduled list of DL activity that certain in recipients may have missed.

Next, at step 450, a recipient can suspend receiving individual messages from a DL. Instead the recipient can link to the activity of the DL for a specified time period. Such an operation effectively turns a barrage of individual emails into a forum that can be accessed via a DL dashboard. In certain embodiments, DL inclusion and/or participation is driven by active Data Loss Prevention policies. More specifically, a DL policy management engine determines appropriate access in real-time based on the user's context. For example, whether to allow a DL from an external/public Internet Protocol (IP) address and/or from a bring your own device (BYOD) user. Another example is using a subject/keyword policy to insure adherence to an original purpose of the DL.

Also, in certain embodiments, a user could create a DL, of all available staff (e.g., team members of a particular project) for an out of office message. The DL would dynamically eliminate individuals who are themselves out of the office. More specifically, in certain embodiments, the out of office message could provide a response which directs a recipient to a dynamically modified list of team members who are presently in the office. This list is dynamically modified to account for team members who are in and out of the office.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method, comprising:
accessing an electronic data storage to identify a priori categories for limiting potential recipients of an electronic message to an appropriate context, wherein the potential recipients are each associated with a directory list;
determining a real-time context for at least one of the potential recipients;
dynamically partitioning the directory list based upon the a priori categories and the real-time context to generate a partitioned directory list that excludes at least one of the potential recipients associated with the directory list from the electronic message to the appropriate context; and
causing the electronic message to be sent to all of the recipients in the partitioned directory list without sending the electronic message to the at least one of the potential recipients that is excluded.

2. The method of claim 1, wherein:
the a priori categories comprise at least one of an inner circle, a trusted advisor category, and a friends of dynamic list category.

3. The method of claim 2, wherein:
the a priori categories are created by a dynamic list owner.

4. The method of claim 2, wherein:
recipients of a dynamic list can change their own category.

5. The method of claim 1, wherein:
the dynamically partitioning further comprises performing a dynamic list dynamic filter operation based, at least in part, on the real-time context.

6. The method of claim 5, wherein:
the dynamic filter operation comprises one or more of filter the dynamic list to only send to frequent participants based on past behaviors, filter the dynamic list to only send to recipients meeting a certain Data Loss Prevention (DLP) policy, filter the dynamic list to only send to recipients who are not out of office, filter the dynamic list to only send to recipients immediately available and filter the dynamic list to only send to recipients that are experts in a discussed topic.

7. A system, comprising:
a processor;
a data bus coupled to the processor; and
a non-transitory, computer-readable storage medium embodying computer program code, the non-transitory, computer-readable storage medium being coupled to the data bus, the computer program code comprising instructions executable by the processor to cause the system to perform operations comprising:
accessing an electronic data storage to identify a priori categories for limiting potential recipients of an electronic message to an appropriate context, wherein the potential recipients are each associated with a directory list;
determining a real-time context for at least one of the potential recipients;
dynamically partitioning the directory list based upon the a priori categories and the real-time context to generate a partitioned directory list that excludes at least one of the potential recipients associated with the directory list from the electronic message to the appropriate context; and
causing the electronic message to be sent to all of the recipients in the partitioned directory list without sending the electronic message to the at least one of the potential recipients that is excluded.

8. The system of claim 7, wherein:
the a priori categories comprise at least one of an inner circle, a trusted advisor category, and a friends of dynamic list category.

9. The system of claim 8, wherein:
the a priori categories are created by a dynamic list owner.

10. The system of claim 8, wherein:
recipients of the electronic message can change their own category.

11. The system of claim 7, wherein:
the dynamically partitioning further comprises performing a dynamic list dynamic filter operation based, at least in part, on the real-time context.

12. The system of claim 11, wherein:
the dynamic filter operation comprises one or more of filter the dynamic list to only send to frequent participants based on past behaviors, filter the dynamic list to only send to recipients meeting a certain Data Loss Prevention (DLP) policy, filter the dynamic list to only send to recipients who are not out of office, filter the dynamic list to only send to recipients immediately available and filter the dynamic list to only send to recipients that are experts in a discussed topic.

13. A non-transitory, computer-readable storage medium embodying computer program code, the computer program code comprising computer executable instructions to cause a system to perform operations comprising:
accessing an electronic data storage to identify a priori categories for limiting potential recipients of an electronic message to an appropriate context, wherein the potential recipients are each associated with a directory list;
determining a real-time context for at least one of the potential recipients;
dynamically partitioning the directory list based upon the a priori categories and the real-time context to generate a partitioned directory list that excludes at least one of the potential recipients associated with the directory list from the electronic message to the appropriate context; and
causing the electronic message to be sent to all of the recipients in the partitioned directory list without sending the electronic message to the at least one of the potential recipients that is excluded.

14. The computer-readable storage medium of claim 13, wherein:
the a priori categories comprise at least one of an inner circle, a trusted advisor category, and a friends of dynamic list category.

15. The computer-readable storage medium of claim 14, wherein:
the a priori categories are created by a dynamic list owner.

16. The computer-readable storage medium of claim 14, wherein:
recipients of the electronic message can change their own category.

17. The computer-readable storage medium of claim 13, wherein:
the dynamically partitioning further comprises performing a dynamic list dynamic filter operation based, at least in part, on the real-time context.

18. The computer-readable storage medium of claim 17, wherein:
the dynamic filter operation comprises one or more of filter the dynamic list, to only send to frequent participants based on past behaviors, filter the dynamic list to only send to recipients meeting a certain Data Loss Prevention (DLP) policy, filter the dynamic list to only send to recipients who are not out of office, filter the dynamic list to only send to recipients immediately available and filter the dynamic list to only send to recipients that are experts in a discussed topic.

\* \* \* \* \*